United States Patent
Maniskas et al.

(10) Patent No.: US 11,699,450 B2
(45) Date of Patent: *Jul. 11, 2023

(54) SYSTEMS AND METHODS OF AUDIO DECODER DETERMINATION AND SELECTION

(71) Applicant: Sonos, Inc., Santa Barbara, CA (US)

(72) Inventors: Nicholas Maniskas, Boston, MA (US); Cameron Korb, Santa Barbara, CA (US); Govind Jeyaram, Seattle, WA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,779

(22) Filed: May 3, 2022

(65) Prior Publication Data

US 2022/0366917 A1 Nov. 17, 2022

Related U.S. Application Data

(63) Continuation of application No. 17/249,629, filed on Mar. 8, 2021, now Pat. No. 11,348,592.

(Continued)

(51) Int. Cl.
*G10L 19/16* (2013.01)
*G10L 19/002* (2013.01)
*H04N 21/439* (2011.01)

(52) U.S. Cl.
CPC .......... *G10L 19/002* (2013.01); *G10L 19/167* (2013.01); *H04N 21/439* (2013.01)

(58) Field of Classification Search
CPC ..................... G10L 19/167; H04N 21/439
See application file for complete search history.

(56) References Cited

U.S. PATENT DOCUMENTS 4,757,518 A * 7/1988 Lagadec ............ G11B 20/1262
375/253
5,440,644 A 8/1995 Farinelli et al.
(Continued)

FOREIGN PATENT DOCUMENTS

| EP | 1389853 A1 | 2/2004 |
|---|---|---|
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Feng-Tzer Tzeng
(74) *Attorney, Agent, or Firm* — Fortem IP LLP; Matt Lincicum

(57) ABSTRACT

Playback devices can support audio encoded using various encoding schemes. Playing back such content includes receiving, at a playback device, audio data from an audio source; and receiving an indication from the audio source that the audio data is encoded in the compressed audio format. The device determines, independently of receiving the indication from the audio source that the audio data is encoded in the compressed audio format, whether the audio data is encoded in a compressed audio format. If the audio data is determined to be encoded in the compressed audio format: the device selects a decoder from among a plurality of decoders; decodes the audio data using the selected decoder; and plays back the decoded audio data via the playback device. If the audio data is determined not to be encoded in the compressed audio format, the device inhibits playback of the audio data.

22 Claims, 8 Drawing Sheets

Related U.S. Application Data

(60) Provisional application No. 62/987,262, filed on Mar. 9, 2020.

(56) References Cited

U.S. PATENT DOCUMENTS

| | | |
|---|---|---|
| 5,761,320 A | 6/1998 | Farinelli et al. |
| 5,923,902 A | 7/1999 | Inagaki |
| 5,982,830 A * | 11/1999 | Maturi ............... H04N 21/4341 |
| | | 375/E7.278 |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 9,378,743 B2 * | 6/2016 | Riedmiller ............ G10L 19/002 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2006/0114136 A1 * | 6/2006 | Chu ........................ H04N 19/12 |
| | | 375/E7.199 |
| 2007/0142944 A1 | 6/2007 | Goldberg et al. |
| 2009/0024234 A1 * | 1/2009 | Archibald ............ G11B 27/038 |
| | | 700/94 |
| 2014/0358554 A1 * | 12/2014 | Riedmiller ............ G10L 19/167 |
| | | 704/500 |
| 2016/0247515 A1 * | 8/2016 | Koishida ............... G10L 19/167 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Sep. 29, 2021, issued in connection with U.S. Appl. No. 17/249,629, filed Mar. 8, 2021, 11 pages.
Notice of Allowance dated Feb. 4, 2022, issued in connection with U.S. Appl. No. 17/249,629, filed Mar. 8, 2021, 8 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

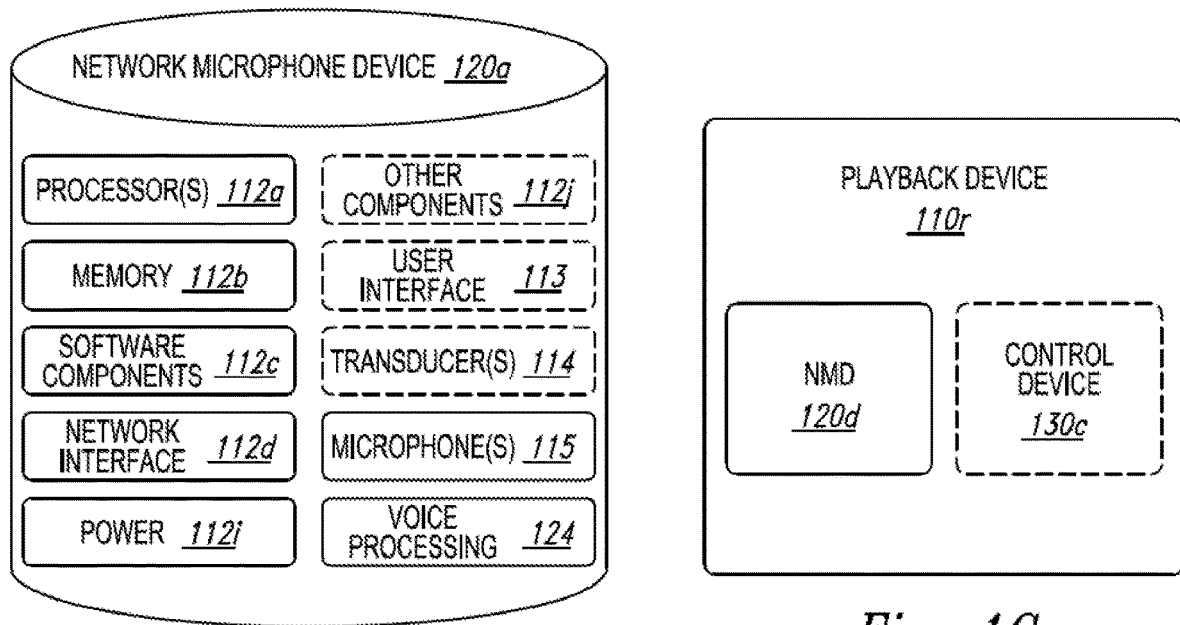
*Fig. 1F*
*Fig. 1G*
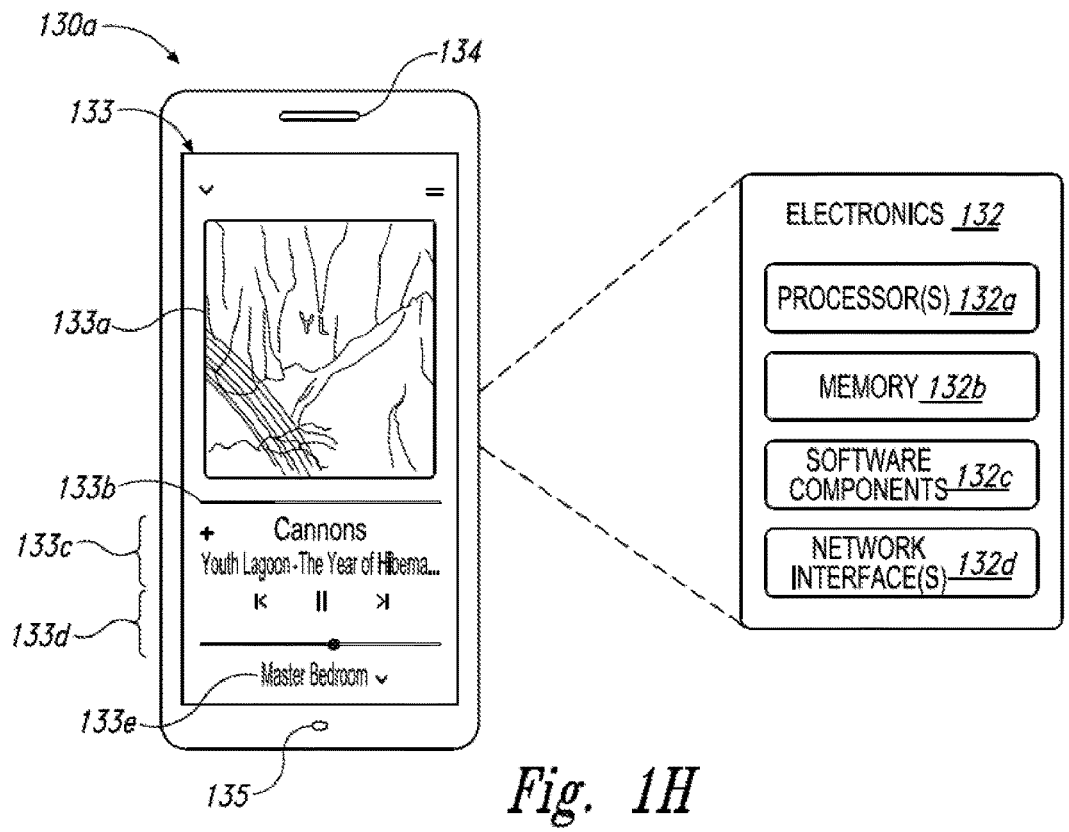
*Fig. 1H*

SYSTEMS AND METHODS OF AUDIO DECODER DETERMINATION AND SELECTION

CROSS-REFERENCE TO RELATED APPLICATION

This application is a continuation of U.S. patent application Ser. No. 17/249,629, filed Mar. 8, 2021, which claims the benefit of priority to U.S. patent application Ser. No. 62/987,262, filed Mar. 9, 2020, which are incorporated herein by reference in their entireties.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

Figure 1A:
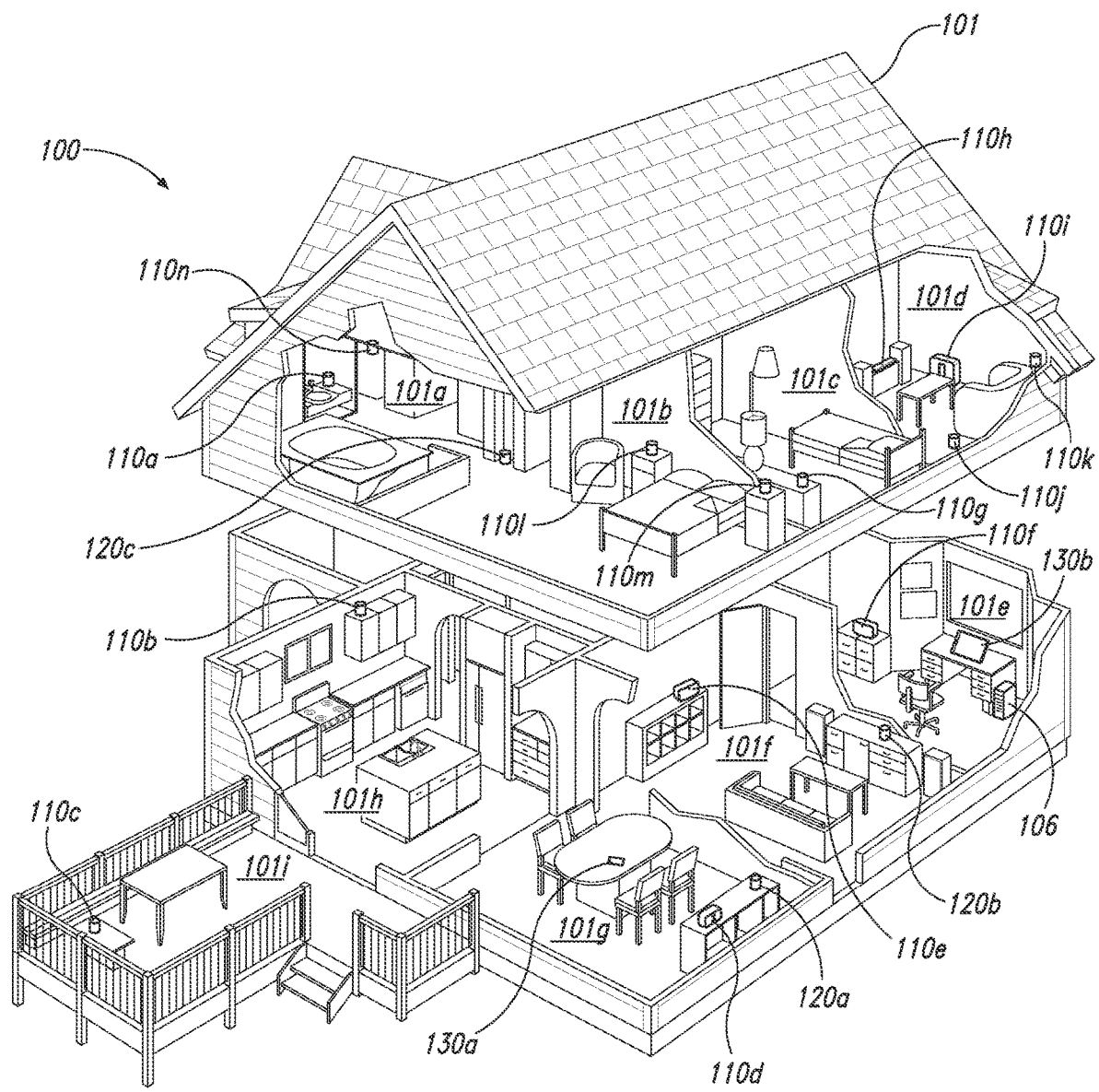
FIG. 1A is a partial cutaway view of an environment having a media playback system configured in accordance with examples of the disclosed technology.

The drawings are for the purpose of illustrating examples of the present technology, but those of ordinary skill in the art will understand that the technology disclosed herein is not limited to the arrangements and/or instrumentality shown in the drawings.

DETAILED DESCRIPTION

I. Overview

Audio input can be encoded using a number of different formats, such as uncompressed pulse-code modulation (PCM), or various types of compressed encoding formats (e.g., Dolby Digital, Dolby Digital Plus, Dolby TrueHD, Dolby Atmos, DTS Digital Surround, DTS-HD High Resolution, DTS-HD Master Audio, etc.). This is particularly true in the audio component of audiovisual media, for example the audio component of television shows or movies. In such cases, a video display device (e.g., a television, a streaming video set-top box, DVD player, etc.) may output audio data to an accompanying playback device such as a soundbar, or a collection of individual playback devices grouped to provide surround-sound, etc. In operation, the playback device(s) can play back the audio component synchronously with video playback via the video display device.

In some cases, the video display device provides to the playback device an indication of whether the incoming data is encoded using a compressed format. This indication may take the form of a channel status block (CSB) in the audio data that indicates, in a binary fashion, whether the incoming audio data is encoded in a compressed format. These CSBs are intended to reliably communicate to audio sink or receiver class devices whether the incoming audio data is encoded using a compressed format (e.g., DTS Digital Surround, Dolby Digital) or in an uncompressed format (e.g., PCM).

In practice, however, the CSBs are unreliable, and in many instances a video display device outputs PCM audio data that is erroneously indicated to be encoded using a compressed format, or conversely the device outputs compressed audio data indicated to be PCM. This misidentification can lead to undesirable results in audio playback. Accordingly, relying solely on the CSB to determine handling of incoming audio data via a playback device can lead to poor user experiences. In particular, playing back audio content utilizing a PCM decoding scheme when the incoming audio data has actually been compressed according to Dolby Digital (or another compressed format), for example, would result in a jarring, undesirable, and often annoying sound. Conversely, playback of audio content may fail altogether if the playback device utilizes a compressed decoding scheme when the incoming data is actually uncompressed PCM.

In addition to differentiating between compressed and uncompressed audio formats, it may be important to differentiate between different types of compressed audio formats. For example, a playback device may support a number of different compressed audio formats. Each format may require a different processing scheme to correctly decode and play back the compressed audio data. In some examples of the present technology, the incoming audio data can be analyzed to identify the particular compressed audio format and, based on this identification, select an appropriate audio decoding scheme.

Accordingly, in order to provide for improved user experiences, and to reliably route incoming audio data to an appropriate decoder, there remains a need for more intelligent analysis of audio data provided from a video display device. As described in more detail herein, in some examples the playback device can examine the incoming audio data and determine, independently of any indication (e.g., CSB) provided by the video display device, whether the audio data is encoded using a compressed format. The analysis can further determine which encoding format is used, and whether the playback device supports playback of the identified format.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for instance, the media playback system 100 is configured to play back audio from a first playback device (e.g., the playback device 110a) in synchrony with a second playback device (e.g., the playback device 110b). Interactions between the playback devices 110, NMDs 120, and/or control devices 130 of the media playback system 100 configured in accordance with the various examples of the disclosure are described in greater detail below.

In the illustrated example of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain examples are described below in the context of a home environment, the technologies described herein may be implemented in other types of environments. In some examples, for instance, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some examples, a single playback zone may include multiple rooms or spaces. In certain examples, a single room or space may include multiple playback zones.

In the illustrated example of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some examples, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip-hop music being played back by playback device 110c on the patio 101i. In some examples, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
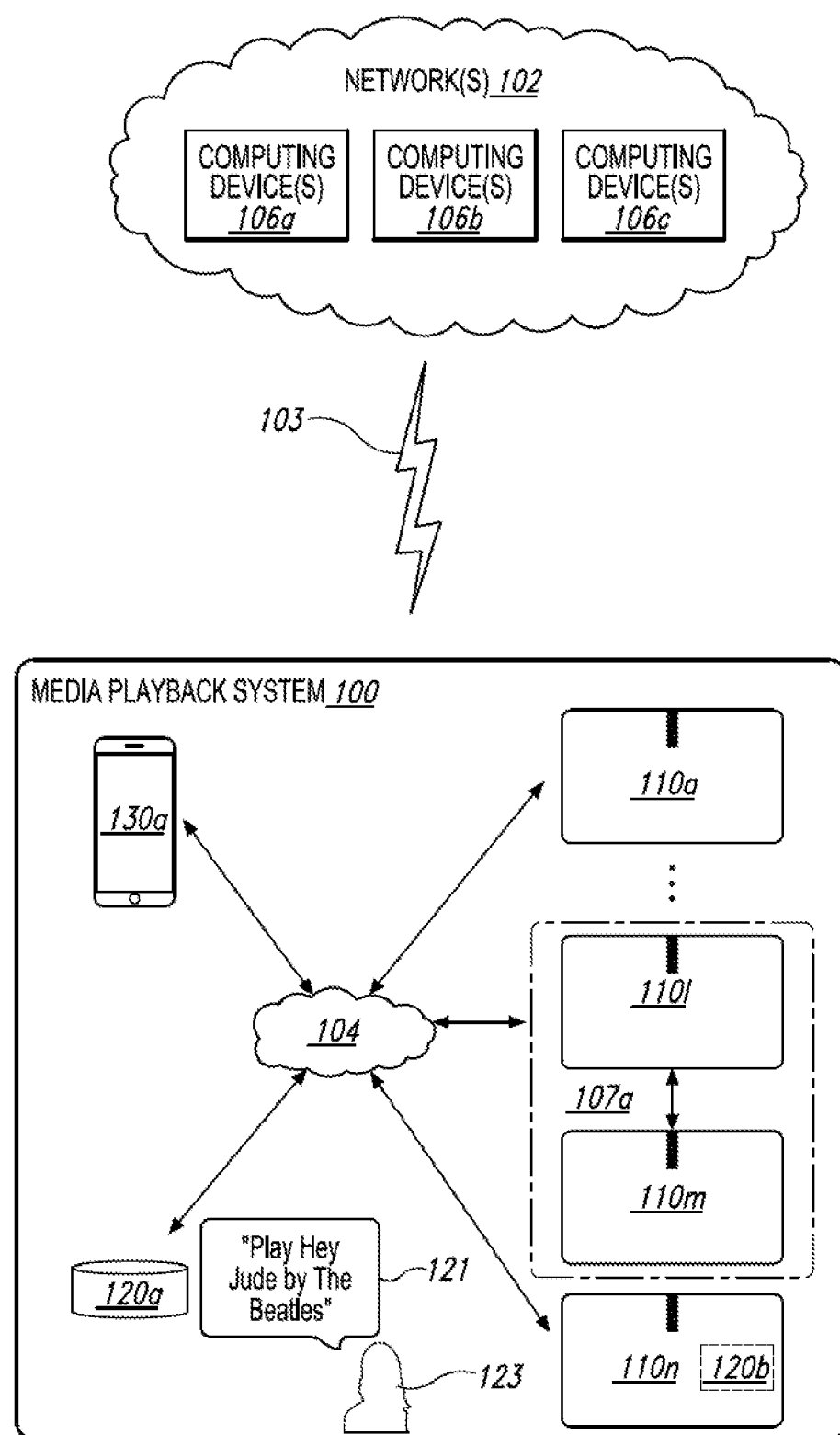
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a Wi-Fi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "Wi-Fi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household Wi-Fi network). In some examples, the links 103 and the network 104 comprise one or more of the same networks. In some examples, for instance, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for instance, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, for instance, the media content database is stored on one or more of the playback devices 110, network microphone devices 120, and/or control devices 130.

In the illustrated example of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for instance, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated example of FIG. 1B, the NMD 120*a* is a stand-alone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some examples, for instance, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
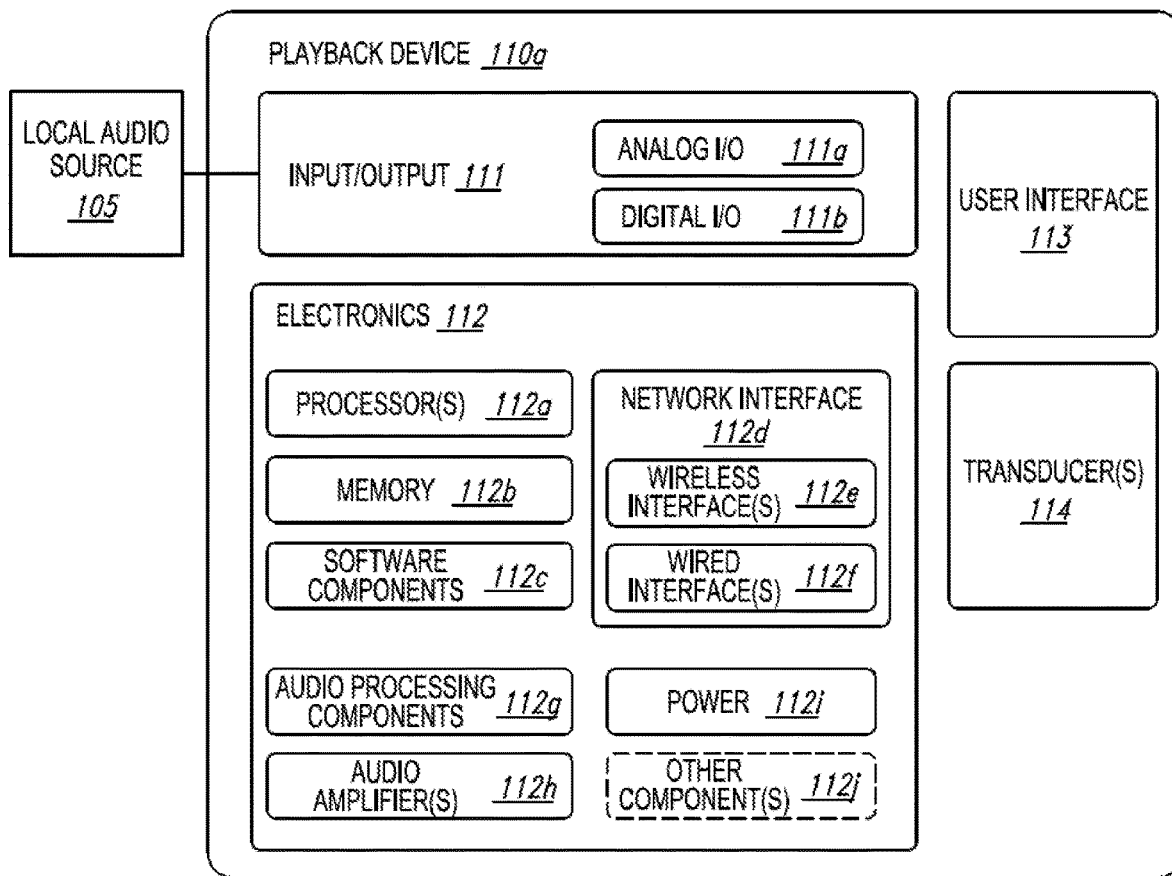
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some examples, the local audio source 105 includes a video display device (e.g., a television, display, Blu-ray player, streaming set-top box, etc.) configured to play back video (or output video to another device) in synchrony with audio playback via the playback device 110*a*. In some examples, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for instance, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some examples, the operations further include causing the playback device 110a to send audio data to another one of the playback devices 110a and/or another device (e.g., one of the NMDs 120). Certain examples include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some examples, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some examples, for instance, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated example of FIG. 1C, the network interface 112d comprises one or more wireless interfaces 112e (referred to hereinafter as "the wireless interface 112e"). The wireless interface 112e (e.g., a suitable interface comprising one or more antennas) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., Wi-Fi, Bluetooth, LTE). In some examples, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112d includes the wired interface 112f and excludes the wireless interface 112e. In some examples, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some examples, the audio processing components 112g comprise, for example, one or more digital-to-analog converters (DAC), audio preprocessing components, audio enhancement components, a digital signal processors (DSPs), and/or other suitable audio processing components, modules, circuits, etc. In some examples, the audio processing components 112g can comprise, for example, one or more audio decoders configured to facilitate playback of audio encoded in a particular format (e.g., pulse-code modulation (PCM), Dolby Digital, DTS, etc.). In certain examples, one or more of the audio processing components 112g can comprise one or more subcomponents of the processors 112a. In some examples, the electronics 112 omits the audio processing components 112g. In some examples, for instance, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some examples, for instance, the amplifiers 112h include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112h comprise a suitable combination of two or more of the foregoing types of power amplifiers. Moreover, in some examples, individual ones of the amplifiers 112h correspond to individual ones of the transducers 114. In other examples, however, the electronics 112 includes a single one of the amplifiers 112h configured to output amplified audio signals to a plurality of the transducers 114. In some other examples, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
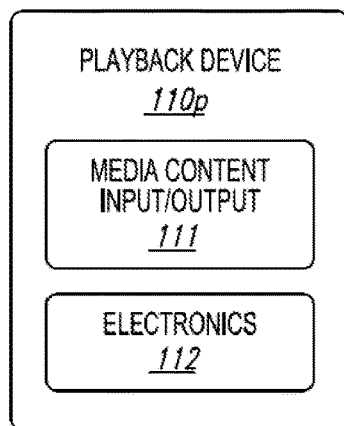
FIG. 1D is a block diagram of a playback device.

By way of illustration, SONOS, Inc. presently offers (or has offered) for sale certain playback devices including, for example, a "SONOS ONE," "MOVE," "PLAY:5," "BEAM," "PLAYBAR," "PLAYBASE," "PORT," "BOOST," "AMP," and "SUB." Other suitable playback devices may additionally or alternatively be used to implement the playback devices of examples disclosed herein. Additionally, one of ordinary skilled in the art will appreciate that a playback device is not limited to the examples described herein or to SONOS product offerings. In some examples, for instance, one or more playback devices 110 comprises wired or wireless headphones (e.g., over-the-ear headphones, on-ear headphones, in-ear earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110p comprising the input/output 111 and electronics 112 without the user interface 113 or transducers 114.

Figure 1E:
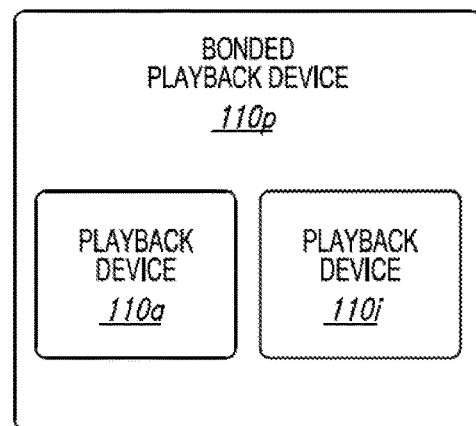
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated example, the playback devices 110a and 110i are separate ones of the playback devices 110 housed in separate enclosures. In some examples, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some examples, for instance, the playback device 110a is full-range playback device configured to render low frequency, mid-range frequency, and high frequency audio content, and the playback device 110i is a subwoofer configured to render low frequency audio content. In some examples, the playback device 110a, when bonded with the first playback device, is configured to render only the mid-range and high frequency components of a particular audio content, while the playback device 110i renders the low frequency component of the particular audio content. In some examples, the bonded playback device 110q includes additional playback devices and/or another bonded playback device. Additional playback device examples are described in further detail below with respect to FIGS. 2A-2C.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some examples, the NMD 120a is configured as a media playback device (e.g., one or more of the playback devices 110), and further includes, for example, one or more of the audio components 112g (FIG. 1C), the amplifiers 114, and/or other playback device components. In certain examples, the NMD 120a comprises an Internet of Things (IoT) device such as, for example, a thermostat, alarm panel, fire and/or smoke detector, etc. In some examples, the NMD 120a comprises the microphones 115, the voice processing components 124, and only a portion of the components of the electronics 112 described above with respect to FIG. 1B. In some examples, for instance, the NMD 120a includes the processor 112a and the memory 112b (FIG. 1B), while omitting one or more other components of the electronics 112. In some examples, the NMD 120a includes additional components (e.g., one or more sensors, cameras, thermometers, barometers, hygrometers).

In some examples, an NMD can be integrated into a playback device. FIG. 1G is a block diagram of a playback device 110r comprising an NMD 120d. The playback device 110r can comprise many or all of the components of the playback device 110a and further include the microphones 115 and voice processing components 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other examples, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing components 124 receive and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated example, the control device 130a comprises a smartphone (e.g., an iPhone™, an Android phone) on which media playback system controller application software is installed. In some examples, the control device 130a comprises, for example, a tablet (e.g., an iPad™), a computer (e.g., a laptop computer, a desktop computer), and/or another suitable device (e.g., a television, an automobile audio head unit, an IoT device). In certain examples, the control device 130a comprises a dedicated controller for the media playback system 100. In other examples, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 132a to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some examples, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130 to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated example, the user interface 133 comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some examples, the one or more speakers comprise individual transducers configured to correspondingly output low frequencies, mid-range frequencies, and/or high frequencies. In some examples, for instance, the control device 130a is configured as a playback device (e.g., one of the playback devices 110). Similarly, in some examples the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130a is configured to operate as playback device and an NMD. In other examples, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

III. Example Systems and Method for Audio Decoder Selection

Figure 2:
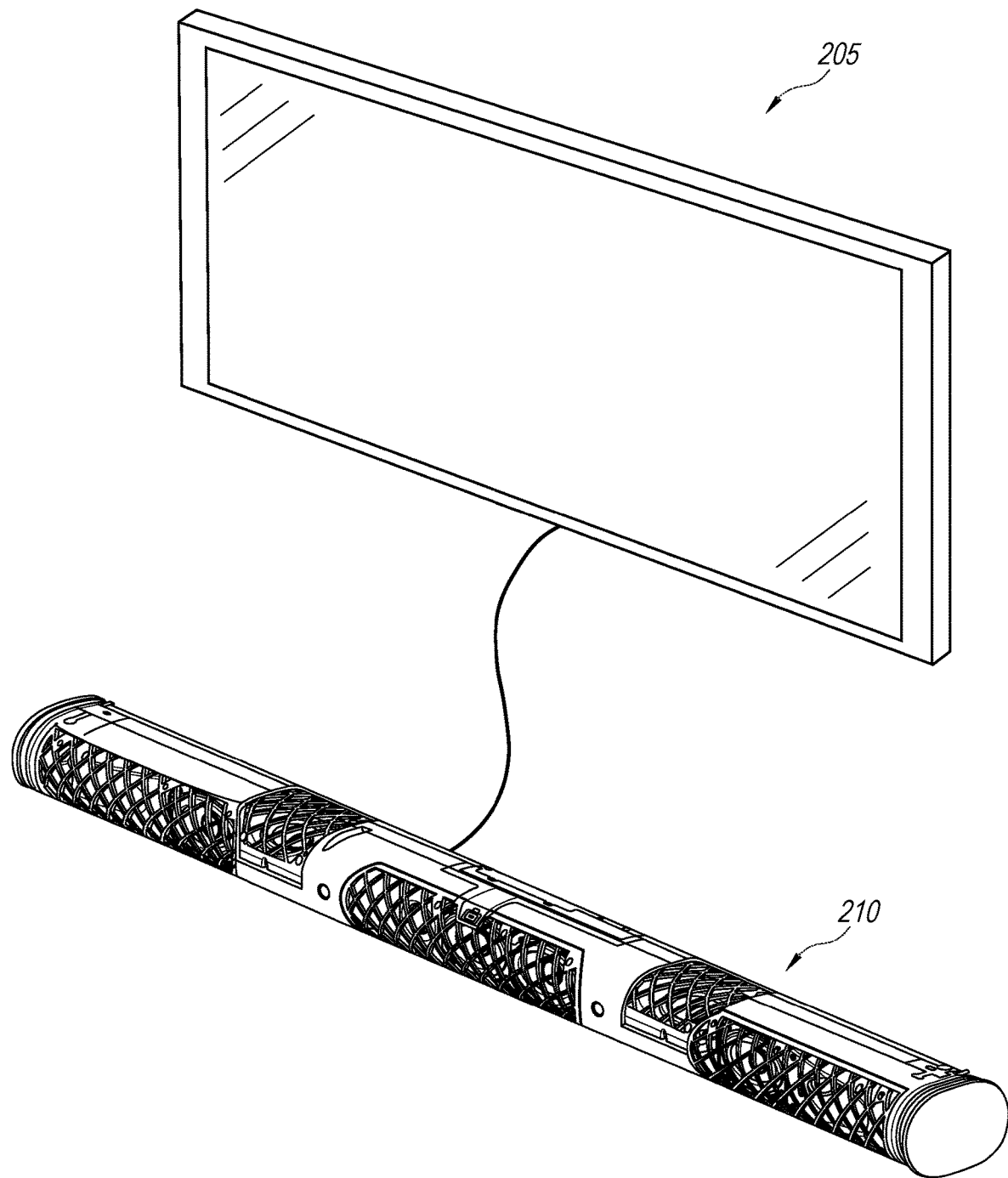
FIG. 2 is a schematic view of a playback device in communication with a video display device in accordance with examples of the present technology.

FIG. 2 is a schematic view of a playback device 210 in communication with a video display device 205 in accordance with examples of the present technology. In some examples, the playback device 210 (e.g., a soundbar or other suitable playback device) can be configured to play back audio accompanying video that is played back via the separate video display device 205. In the illustrated example, the video display device 205 is a television, and there is a physical connection (e.g., wire, cable, etc.) that carries audio input from the display device 205 to the playback device 210. However, in other examples, a wireless signal (e.g., Wifi, Bluetooth) connects the display device 205 to the playback device 210 without a wire or other physical connection. In some examples, instead of or in addition to a television, the video display device can be, for example, a streaming device (e.g., APPLE TV, GOOGLE CHROMECAST, etc.), a Blu-ray player, or any other such device that simultaneously sends video content to a display device such as a projector or television and also sends audio content to accompanying audio devices (e.g., playback device 210). Although a soundbar is shown in this example, the playback device 210 can take any suitable form, including multiple different playback devices that have been grouped together for synchronous playback, such as in a home theatre surround-sound configuration.

In operation, the video display device 205 can provide audio data to the playback device 210 for audio playback. The audio data may be provided in any suitable format, including, for instance, both uncompressed audio (e.g. audio encoded using pulse-code modulation (PCM)) and compressed audio (e.g., audio encoded using Dolby Digital, Dolby Digital Plus, Dolby TrueHD, Dolby Atmos, DTS Digital Surround, DTS-HD High Resolution, DTS-HD Master Audio, or other encoding scheme that involves compression of the audio data). To effectively play back the audio content, the playback device 210 decodes the audio data utilizing the appropriate decoding scheme. For example, PCM audio data may be handled using one processing scheme, while DTS-encoded audio data may be decoded using a different processing scheme. Applying an incorrect processing scheme to the incoming encoded audio data can result in failure either in the form of no audio output or audio output that scrambles the intended output (e.g., movie dialogue being output in a scrambled manner may sound like gunfire). While video display devices often designate the particular format of incoming audio content (particularly compressed vs. uncompressed audio), such indications are not always reliable and may vary from one manufacturer to the next. To ensure the playback device 210 appropriately decodes incoming audio data from the video display device 205, the playback device 210 can process incoming audio using one or more of the methods described herein.

Figure 3:
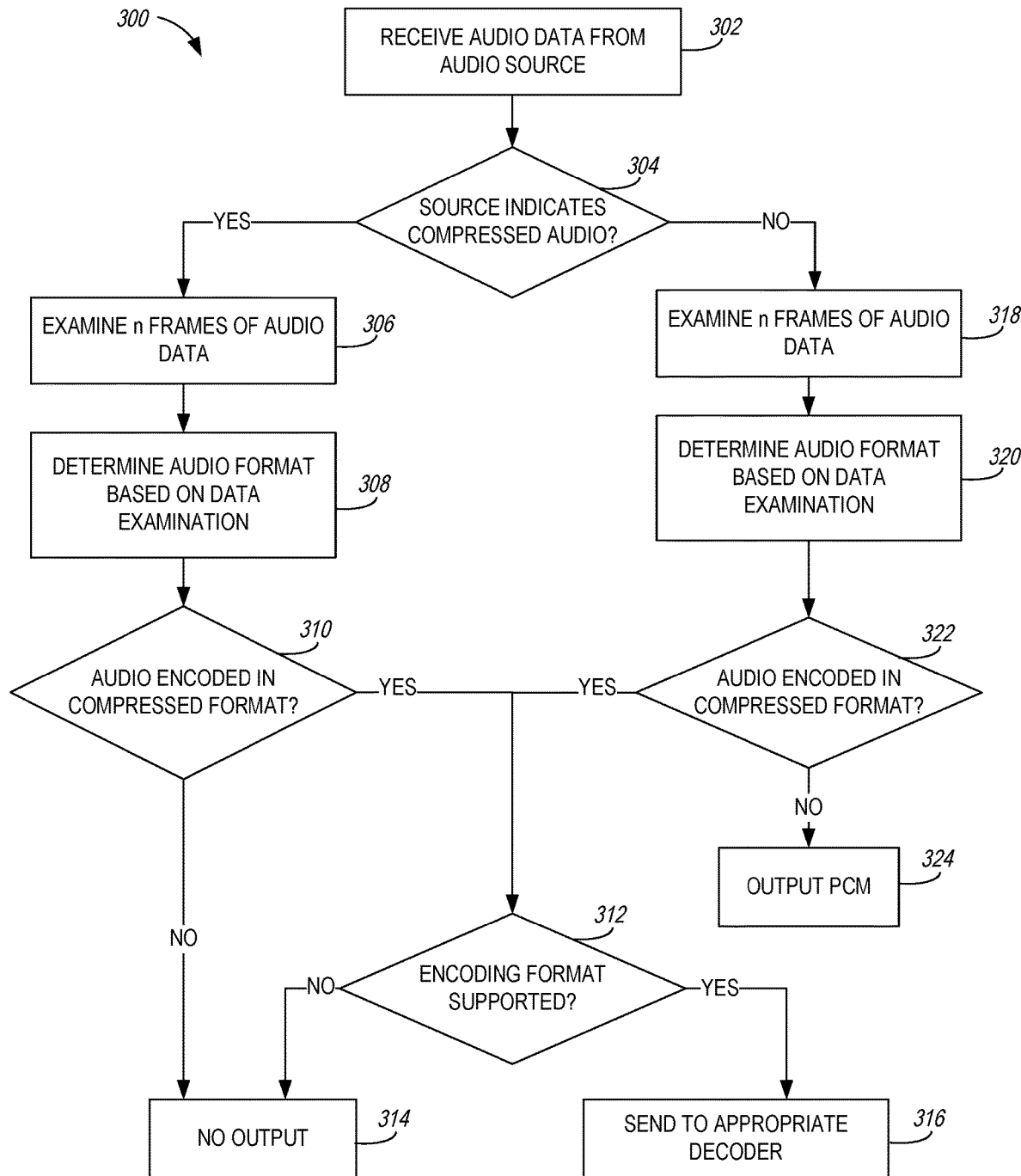
FIG. 3 is a flow diagram of a method for decoding audio data in accordance with examples of the present technology.

FIG. 3 is a flow diagram of a process 300 for decoding audio data in accordance with examples of the present technology. In some examples, the process 300 includes one or more instructions stored in memory (e.g., the memory 112b of FIG. 1) and executed by one or more processors (e.g., the processor 112a of FIG. 1) of a playback device (e.g., the playback device 110 of FIG. 1, the playback device 205 of FIG. 2). Although the blocks are shown in a particular order, in some examples the steps may be performed in different orders. Additionally or alternatively, certain blocks may be omitted, combined, or sub-divided into separate blocks.

In block 302, the playback device receives audio data from an audio source, such as a television or other video display device. In block 304, the playback device determines whether the audio source indicates the incoming audio data to be in a compressed format. For example, the incoming audio data may include a channel status block (CSB) or other indicator that designates whether the incoming audio data is in an uncompressed format (e.g., PCM) or a compressed format.

In incoming digital audio data, each sub-frame may contain a channel status bit. A digital audio block may contain 192 channel sub-frames, and accordingly there may be 192 status bits per channel that together form a channel status block (CSB). The CSB may carry status information regarding the channel's digital audio information. This information can include whether the audio data is standard PCM or if it has been modified according to a compression scheme. In some instances, the second bit in a channel status bit array indicates whether the audio is encoded using linear PCM (logic 0) or if the audio has been compressed (logic 1). The CSB can also convey other information, such as sample rate, emphasis, bit depth, error correction data, etc. This example is provided for purposes of illustration only. Alternatively, other tags or indicia either present in the audio data itself, such as metadata or other such indications, may provide a designation to the playback device that the audio data is compressed.

As noted previously, such indications are not necessarily reliable, and a mis-match between the format indicated by such a tag and the actual format of the incoming audio could lead to poor outcomes and undesirable user experiences (e.g., blasting undesirable and annoying noises as the playback device processes the audio as PCM when the audio is actually encoded in a compressed format).

If, in block 304, the audio source indicates the audio to be compressed (e.g., based on an indication in the CSB), the process 300 continues to block 306 in which the playback device evaluates N frames of the audio data, and in block 308, the playback device determines the audio format based on that data examination. For example, the playback device can evaluate 2 or more frames of audio data, with each frame including 128 samples. In these blocks, the playback device inspects the incoming audio directly to assess the audio format (as opposed to relying on the CSB or other tag provided by the video display device).

In some examples, incoming digital audio that has been encoded using a compressed format (e.g., any non-linear-PCM encoding scheme) may comport to IEC Standard 61937:2020, published Jan. 6, 2020 by the International Electrotechnical Commission, which is hereby incorporated by reference in its entirety. However, the principles described herein can be applied to digital audio that comports to other standards or includes other formats for conveying compression format data.

In some examples, the playback device can examine N frames (e.g., 2 frames, each including 128 samples) to scan for sync words. As one of skill in the art will appreciate, a sync word may be one predefined word (or one of several predefined words) with a specific bit pattern that designates the beginning of each frame and allows system synchronization to be obtained. For example, the sync word may be a 64-bit PaPb sync word. In some examples, the playback device can examine a sufficient number of frames of the audio data to identify at least two occurrences of the sync word (e.g., in sequential, contiguous frames). This can reduce the risk of erroneously "detecting" a sync word in PCM data where it is not intended.

In certain compressed audio standards, the bits subsequent to the sync word describe the compression format of the audio data, for example indicating the audio data as being encoded according to Dolby Digital, DTS, etc. For example, the 64 bits following the 64-bit PaPb sync word (e.g., PcPd) may indicate a particular compressed encoding format. In some examples, there may be a finite and predefined number of valid sequences of data following the sync word, each of which corresponds to a particular encoding format.

The process 300 continues in block 310 with determining whether the audio is encoded in a compressed format. For example, if no valid audio format is found in block 308 (e.g., data in the 64 bits following the sync word does not correspond to any predefined format indicating a particular encoding format), then no audio is output (block 314). This reflects a scenario in which the video display device has indicated the incoming audio is compressed (e.g., via the CSB) while inspection of the audio data via the playback device has disconfirmed this, finding no valid encoding format. As such, the video display device's indication may be erroneous, and so no audio is output. A response of no output may be particularly appropriate in this case, as playing back compressed audio utilizing a PCM scheme can result in a jarring, annoying, and undesirable audio output. As such, it is better for the user's experience to have no audio output in such a scenario, rather than risk bombarding the user with cacophonous audio.

Returning to block 310, if a valid audio format is found in block 308 (e.g., data in the 64 bits following the sync words corresponds to a predefined format indicating a particular encoding format), then the playback device has confirmed the audio is encoded in a compressed format. The process 300 may then continue to block 312 to determine whether the encoding format is supported. Although a particular compressed encoding format can be identified via inspection of the audio data, the playback device may not support decoding of all identifiable encoding formats. For example, the playback device may support playback of audio encoded according to the DTS standard, while not supporting playback of audio encoded according to the Dolby Atmos standard. If the encoding format is not supported, then the process 300 terminates in block 314 with no output. Conversely, if the encoding format is supported, then the process continues in block 316 with sending the data stream to the appropriate decoder for processing and eventual playback. This reflects the scenario in which the format indicated by the video display device (a compressed audio format as indicated in decision block 304) matches with the format identified by inspection of the audio data via the playback device (as indicated in decision block 310). As such, it is likely that the audio data is indeed encoded in the identified compressed format, and playback can proceed accordingly.

As noted above, if (1) the audio format is unsupported (block 312) or (2) the audio is determined not to be encoded in a compressed format (block 310) while the source indicates compressed audio (block 304), no audio may be output (block 314). In such scenarios, in addition to inhibiting audio playback, an alert, error message, or other suitable output can be provided. For example, an indication of the particular failure can be output to a user via a control device (e.g., control device 130a of FIG. 1H), or may be provided as audible output via a playback device, visual output displayed via the display device, or as any other suitable notification. Additionally or alternatively, a report of the particular error can be transmitted to remote computing devices associated with a device manufacturer, warranty provider, media content provider, or other entity. In some examples, the particular format of audio content provided to the source may be modified based at least in part on error reports generated via the playback device.

Returning to block 304, if the source indicates the audio is not compressed (e.g., the audio data is indicated to be in PCM format via the CSB), then the process proceeds to blocks 318 and 320 to examine N frames of audio data and determine the audio format based on data examination. These blocks can be similar to blocks 306 and 308 described previously. For example, the audio data can be scanned for a sync word and bits subsequent to the identified sync word can be evaluated for correspondence with predefined values that designate particular encoding formats.

In block 322, the playback device determines whether the audio is encoded in a compressed format, similar to block 310 described above. For example, if examination of the audio data in block 320 results in identification of a particular compression format (e.g., a sync word is found and data in the 64 bits following the sync word corresponds to a predefined format indicating a particular encoding format), the process continues to block 312 to determine whether the format is supported, and then either to no output (block 314) if the output is not supported or to the appropriate decoder (block 316) if the particular encoding format is supported. This flow reflects the scenario in which the source indicates the incoming audio to be uncompressed (e.g., PCM), yet examination of the data via the playback device (blocks 318 and 320) contradicts this indication. In this scenario, the designation from the source is overridden, the audio is played back (if the particular format is supported by the playback device). In contrast to the scenario in which compressed audio data is played back as PCM (resulting in a machine-gun sound), attempted playback of PCM-encoded audio data using another decoding scheme (e.g., Dolby Digital) will generally fail and provide no output. As such, there is less risk of attempting playback in the case of a mismatch between the non-compression identified by the source and the compressed format identified by inspection of the audio data by the playback device.

Returning to block 322, if the audio is not encoded in a compressed format (e.g., either no sync word is found or data subsequent to the sync word does not correspond to indication of a compression format), then the audio is output utilizing a PCM processing scheme. This flow reflects a scenario in which the designation via the audio source (block 304) as uncompressed PCM audio (block 304) matches with the determination made by the playback device that the audio is uncompressed (block 322). As such, the PCM format has been confirmed, and playback can proceed accordingly in block 324.

The process 300 illustrates one sample flow for a particular block of audio data (e.g., containing N number of frames). However, the process can be performed iteratively and/or continuously on incoming data. For example, the audio output from a video display device or other source may be changed, and this change may include different encoding formats (e.g., a user may switch from one streaming service that encodes audio data via PCM and another streaming service that encodes audio data via Dolby Digital). As such, continuous analysis of indications provided from an audio source (e.g., CSB) and examination of audio data (e.g., identifying sync words and inspecting subsequent data) can be used to alter the processing scheme applied to the incoming audio data in real-time or near real-time.

Figure 4:
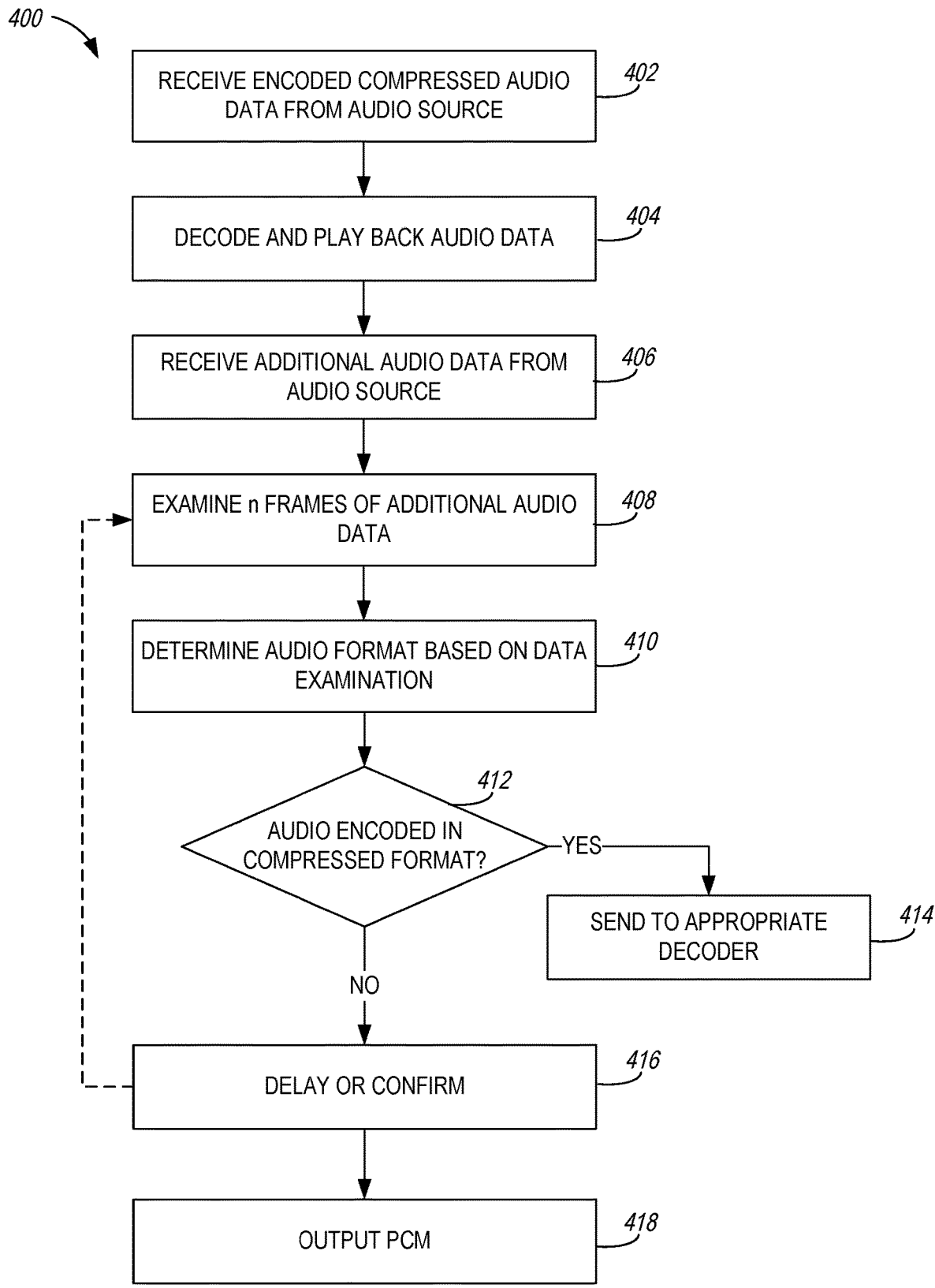
FIG. 4 is a flow diagram of another method for decoding audio data in accordance with examples of the present technology.

FIG. 4 is a flow diagram of another process 400 for decoding audio data in accordance with examples of the present technology. In some examples, the process 400 includes one or more instructions stored in memory (e.g., the memory 112b of FIG. 1) and executed by one or more processors (e.g., the processor 112a of FIG. 1) of a playback device (e.g., the playback device 110 of FIG. 1, the playback device 205 of FIG. 2). Although the blocks are shown in a particular order, in some examples the steps may be performed in different orders. Additionally or alternatively, certain blocks may be omitted, combined, or sub-divided into separate blocks.

The process 400 illustrates an example flow for handling a potential transition of incoming audio data from a compressed audio format to an uncompressed audio format. For example, a video display device may be outputting audio content in a compressed format while streaming a movie from a first media content provider. When a user switches to broadcast television, the accompanying audio data output from the display device may be encoded in an uncompressed format (e.g., PCM). As noted previously, outputting compressed audio utilizing a PCM processing scheme can lead to highly undesirable user experiences, and accordingly it can be advantageous to introduce a gating logic to confirm any indication of a transition from compressed audio to uncompressed audio before processing the audio data utilizing a PCM processing scheme.

In block 402, the playback device receives encoded compressed audio (e.g., Dolby Digital, DTS Digital Surround, etc.) from an audio source (e.g., a television, video streaming device, etc.). In block 404, the playback device can decode and play back the audio data, for example using at least a portion of the process 300 described above with respect to FIG. 3.

In block 406, the playback device receives additional subsequent audio data from the audio source. This subsequent data can be examined in blocks 408 and 410 to determine whether the audio is in a compressed format and to optionally identify the particular encoding format. These blocks 408 and 410 can proceed similar to blocks 306 and 308 described above with respect to FIG. 3. For example, N frames of additional audio data can be examined to identify a sync word (optionally confirming the sync word by identifying two or more sequential occurrences). The audio data can be examined to determine an audio format (e.g., by examining data subsequent to the sync word for correspondence to one of a predefined number of valid formats that indicate a particular compressed encoding format).

In block 412, if the additional audio is determined to be encoded in a compressed format, then the audio is sent to an appropriate decoder 414. Alternatively, if the particular compressed format is not supported by the playback device, audio playback can be ceased. In some examples, the appropriate decoder in block 414 may be different from the decoder being previously applied to the incoming audio data. As such, based on the determination in block 410, the playback device may adjust playback by switching to a different decoding scheme.

If, in block 414, the audio is determined not to be encoded in a compressed format (e.g., inspection of the data in block 410 indicates the audio data is PCM), then in block 416 playback can be delayed while the process is repeated on subsequent incoming audio data. For example, the process can return to block 408 for subsequent data while no playback occurs. Only when multiple blocks of audio data (e.g., each including N number of frames) have been evaluated and each been identified as PCM is the audio data confirmed as PCM, and then in block 418 the playback device can play back the audio data according to a PCM processing scheme. In some examples, the delay in block 416 can be between about 10 ms and about 1 second, or between about 50 ms and about 500 ms, or about 100 ms. This delay and confirmation (block 416) can advantageously reduce the risk that non-PCM audio is output according to a PCM processing scheme. Without such a delay and confirmation, the playback device may erroneously detect uncompressed audio input for example, while a user is changing channels or otherwise adjusting the audio source. The intermittent noise or jitter may not actually be encoded as PCM and yet may not be recognized as compressed audio data. Accordingly, to avoid outputting such noise or jitter as PCM, the delay and confirmation (block 416) refrains from switching from a non-PCM decoding scheme to a PCM decoding scheme until sufficient time has passed and the subsequent audio has been confirmed as being in PCM format.

Figure 5:
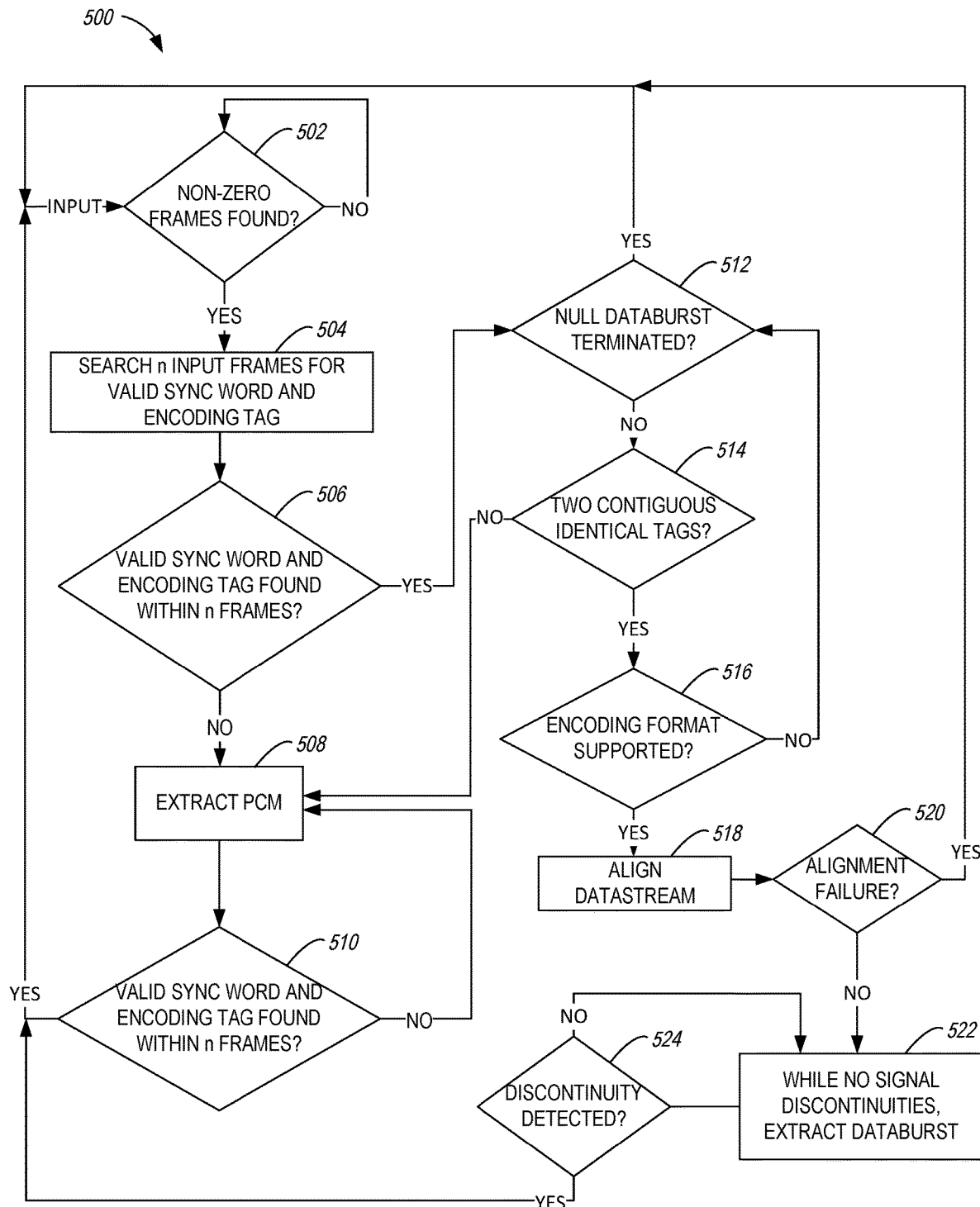
FIG. 5 illustrates a state machine for decoding audio data in accordance with examples of the present technology.

FIG. 5 is a diagram of a state machine 500 for decoding audio data in accordance with examples of the present technology. The processing flows illustrated in FIG. 5 can correspond at least in part of the processes 300 and 400 described previously. In some examples, the state machine 500 reflects one or more instructions stored in memory (e.g., the memory 112b of FIG. 1) that can be executed by one or more processors (e.g., the processor 112a of FIG. 1) of a playback device (e.g., the playback device 110 of FIG. 1, the playback device 205 of FIG. 2).

As shown in FIG. 5, an input (e.g., an audio input from a video display device or other source) proceeds to block 502. If non-zero frames are not found, this indicates there is no incoming audio data and decision block 502 iteratively repeats until non-zero frames are found. Once non-zero frames are found in block 502, in block 504 N input frames are searched for valid sync word(s) and an encoding tag. For example, as described above with respect to FIG. 3, a sync word can be identified and subsequent data can be examined for an encoding tag (e.g., data that indicates a particular type of compressed encoding format). Next, in block 506, if no valid sync word and/or no encoding tag are found within N frames, then PCM is extracted in block 508. The extracted PCM can then be processed according to a PCM processing scheme for audio playback. In block 510, subsequent audio continues to be evaluated to determine if a valid sync word and encoding tag is found within N frames. If so, the process returns to block 502. If not, then the subsequent audio continues to be extracted as PCM for audio playback.

Returning to block 506, if a valid sync word and encoding tag are found, then in decision block 512 the playback device determines whether the null databurst is terminated. If the null databurst is terminated in block 512, the process returns to input to block 502. If the null databurst is not encountered, the process continues to block 514 to identify two contiguous identical tags. For example, a sync word and subsequent tag may be identified in block 504. Subsequent frames can be evaluated and, if another occurrence of the same sync word and the same encoding tag are not identified within N frames, then the audio data is extracted as PCM in block 508. This reflects a scenario in which the initial identification of a sync word and encoding tag was likely a false positive, since a subsequent repetition of the sync word and encoding tag was not found.

Alternatively, if a contiguous and identical sync word and encoding tag are found in block 514, the process continues to block 516 to determine whether the encoding format is supported. If the format is not supported, the process returns to block 512 to determine whether the null databurst is terminated. In this manner, if the encoding format is not supported, there is no audio playback. This loop continues until subsequent audio data is either extracted as PCM or is encoded in a compressed format supported by the playback device.

In block 518, if the encoding format is supported (block 516), the datastream is aligned. For example, using the sync word (block 504), the datastream can be aligned for synchronous playback (e.g., for the audio to be played back in synch with video play back via the video display device). If, in block 520, an alignment failure is detected, the process returns to block 502. If instead, there is no alignment failure, then the process continues to block 522, in which, while there are no signal discontinuities, the databurst is extracted. A discontinuity can be identified when an identified sync word is not in the correct position relative to the previous occurrence (e.g., every 1536 frames for DOLBY DIGITAL). The extracted databurst can be decoded using an appropriate decoding scheme and the audio played back via the playback device.

If, in block 524, a discontinuity is not detected, the extraction continues in block 522. If, in contrast, a discontinuity is detected in block 524, the process returns to input to block 502. As such, audio determined to be encoded using a particular compression format (as identified in block 504 and confirmed in block 514) can be aligned and played back so long as there are no discontinuities, which may indicate a change in the audio input format (e.g., changing from one streaming service to another).

IV. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "example" means that a particular feature, structure, or characteristic described in connection with the example can be included in at least one example or embodiment of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated according to various examples described below. Various examples of the disclosed technology are described as numbered clauses (1, 2, 3, etc.) for convenience. These are provided as examples and do not limit the disclosed technology. It is noted that any of the dependent Clauses may be combined in any combination, and placed into a respective independent Clause. The other Clauses can be presented in a similar manner.

Clause 1. A method of playing back audio content comprising: receiving, at a playback device, audio data from a video display device; receiving an indication from the video display device that the audio data is encoded in a compressed audio format; determining, independently of receiving the indication from the video display device that the audio data is encoded in the compressed audio format, whether the audio data is encoded in a compressed audio format; if the audio data is determined to be encoded in the compressed audio format: selecting a decoder from among a plurality of decoders; decoding the audio data using the selected decoder; and playing back the decoded audio data via the playback device; and if the audio data is determined not to be encoded in the compressed audio format: inhibiting playback of the audio data.

Clause 2. The method of Clause 1, wherein receiving the indication from the video display device that the audio data is encoded in a compressed audio format comprises detecting a channel status block (CSB) indicating that the audio data is encoded in a compressed audio format.

Clause 3. The method of any one of the preceding Clauses, wherein determining, independently of receiving the indication from the video display device that the audio data is encoded in the compressed audio format, whether the audio data is encoded in a compressed audio format comprises: searching a predetermined number of frames of the audio data to detect a sync word; and analyzing a data burst of the audio data subsequent to the sync word to identify an encoding scheme.

Clause 4. The method of any one of the preceding Clauses, further comprising: after detecting the sync word; searching a second predetermined number of frames subsequent to the sync word to identify a second repetition of the sync word.

Clause 5. The method of any one of the preceding Clauses, wherein analyzing the data burst of the audio data subsequent to the sync word comprises determining whether the data burst corresponds to one of a plurality of predetermined valid sequences corresponding to an encoding scheme, wherein: if the data burst corresponds to one of the plurality of predetermined valid sequences, determining that the audio data is encoded in a compressed audio format; and if the data burst does not correspond to one of the plurality of predetermined valid sequences, determining that the audio data is not encoded in a compressed audio format.

Clause 6. The method of any one of the preceding Clauses, further comprising: playing back decoded audio data via the playback device; and while playing back the decoded audio data: receiving, at the playback device, additional audio data from the audio source; evaluating the additional audio data to determine whether the additional audio data is encoded in a compressed audio format; if the audio data is determined not to be encoded in a compressed audio format, initiating playback of the additional audio data only after a predetermined delay.

Clause 7. The method of any one of the preceding Clauses, wherein the video display device comprises a television, and wherein the playback devices comprises a soundbar.

Clause 8. The method of any one of the preceding Clauses, wherein the plurality of decoders comprises at least two or more of: a DOLBY DIGITAL decoder; a DOLBY DIGITAL PLUS decoder, a MAP decoder; a DOLBY ATMOS decoder; a DTS:X decoder; or a MAP decoder.

Clause 9. A playback device configured comprising: at least one amplifier configured to drive an audio transducer; one or more processors; and a computer-readable memory storing instructions that, when executed by the one or more processors, cause the playback device to perform operations comprising: receiving, at a playback device, audio data from a video display device; receiving an indication from the video display device that the audio data is encoded in a compressed audio format; determining, independently of receiving the indication from the video display device that the audio data is encoded in the compressed audio format, whether the audio data is encoded in a compressed audio format; if the audio data is determined to be encoded in the compressed audio format: selecting a decoder from among a plurality of decoders; decoding the audio data using the selected decoder; and playing back the decoded audio data via the playback device; and if the audio data is determined not to be encoded in the compressed audio format: inhibiting playback of the audio data.

Clause 10. The playback device of any one of the preceding Clauses, wherein receiving the indication from the video display device that the audio data is encoded in a compressed audio format comprises detecting a channel status block (CSB) indicating that the audio data is encoded in a compressed audio format.

Clause 11. The playback device of any one of the preceding Clauses, wherein determining, independently of receiving the indication from the video display device that the audio data is encoded in the compressed audio format, whether the audio data is encoded in a compressed audio format comprises: searching a predetermined number of frames of the audio data to detect a sync word; and analyzing a data burst of the audio data subsequent to the sync word to identify an encoding scheme.

Clause 12. The playback device of any one of the preceding Clauses, wherein the operations further comprise: after detecting the sync word, searching a second predetermined number of frames subsequent to the sync word to identify a second repetition of the sync word.

Clause 13. The playback device of any one of the preceding Examples, wherein analyzing the data burst of the audio data subsequent to the sync word comprises determining whether the data burst corresponds to one of a plurality of predetermined valid sequences corresponding to an encoding scheme, wherein: if the data burst corresponds to one of the plurality of predetermined valid sequences, determining that the audio data is encoded in a compressed audio format; and if the data burst does not correspond to one of the plurality of predetermined valid sequences, determining that the audio data is not encoded in a compressed audio format.

Clause 14. The playback device of any one of the preceding Clauses, wherein the operations further comprise: playing back decoded audio data via the playback device; and while playing back the decoded audio data: receiving, at the playback device, additional audio data from the audio source; evaluating the additional audio data to determine whether the additional audio data is encoded in a compressed audio format; if the audio data is determined not to be encoded in a compressed audio format, initiating playback of the additional audio data only after a predetermined delay.

Clause 15. Tangible, non-transitory computer-readable medium storing instructions that, when executed by the one or more processors of a playback device, cause the playback device to perform operations comprising: receiving, at a playback device, audio data from a video display device; receiving an indication from the video display device that the audio data is encoded in a compressed audio format; determining, independently of receiving the indication from the video display device that the audio data is encoded in the compressed audio format, whether the audio data is encoded in a compressed audio format; if the audio data is determined to be encoded in the compressed audio format: selecting a decoder from among a plurality of decoders; decoding the audio data using the selected decoder; and playing back the decoded audio data via the playback device; and if the audio data is determined not to be encoded in the compressed audio format: inhibiting playback of the audio data.

Clause 16. The computer-readable medium of any one of the preceding Clauses, wherein receiving the indication from the video display device that the audio data is encoded in a compressed audio format comprises detecting a channel status block (CSB) indicating that the audio data is encoded in a compressed audio format.

Clause 17. The computer-readable medium of any one of the preceding Clauses, wherein determining, independently of receiving the indication from the video display device that the audio data is encoded in the compressed audio format, whether the audio data is encoded in a compressed audio format comprises: searching a predetermined number of frames of the audio data to detect a sync word; and analyzing a data burst of the audio data subsequent to the sync word to identify an encoding scheme.

Clause 18. The computer-readable medium of any one of the preceding Clauses, wherein the operations further comprise: after detecting the sync word, searching a second predetermined number of frames subsequent to the sync word to identify a second repetition of the sync word.

Clause 19. The computer-readable medium of any one of the preceding Clauses, wherein analyzing the data burst of the audio data subsequent to the sync word comprises determining whether the data burst corresponds to one of a plurality of predetermined valid sequences corresponding to an encoding scheme, wherein: if the data burst corresponds to one of the plurality of predetermined valid sequences, determining that the audio data is encoded in a compressed audio format; and if the data burst does not correspond to one of the plurality of predetermined valid sequences, determining that the audio data is not encoded in a compressed audio format.

Clause 20. The computer-readable medium of any one of the preceding Clauses, wherein the operations further comprise: playing back decoded audio data via the playback device; and while playing back the decoded audio data: receiving, at the playback device, additional audio data from the audio source; evaluating the additional audio data to determine whether the additional audio data is encoded in a compressed audio format; if the audio data is determined not to be encoded in a compressed audio format, initiating playback of the additional audio data only after a predetermined delay.

The invention claimed is:

1. A playback device comprising:
at least one amplifier configured to drive an audio transducer;
one or more processors; and
data storage storing instructions that, when executed by the one or more processors, cause the playback device to perform operations comprising:
receiving, at the playback device, first audio data from a video display device;
receiving an indication from the video display device that the first audio data is encoded in a compressed audio format;
selecting a decoder from among a plurality of decoders;
decoding the first audio data using the selected decoder;
playing back the decoded first audio data via the playback device;
while playing back the first audio data, receiving, at the playback device, second audio data from the video display device, the second audio data encoded via an uncompressed pulse-code modulation (PCM) format;
determining, via the playback device, that the second audio data is encoded in the uncompressed PCM format;
based on the determination that the second audio data is encoded in the uncompressed PCM format, delaying playback of the second audio data for a period of time; and
after delaying playback for the period of time, initiating playback of the second audio data.

2. The playback device of claim 1, wherein receiving the indication from the video display device that the first audio data is encoded in the compressed audio format comprises detecting a channel status block (CSB) indicating that the first audio data is encoded in a compressed audio format.

3. The playback device of claim 1, wherein the operations further comprise determining, independently of receiving the indication from the video display device that the first audio data is encoded in the compressed audio format, that the first audio data is encoded in the compressed audio format.

4. The playback device of claim 3, wherein determining, independently of receiving the indication from the video display device that the first audio data is encoded in the compressed audio format, that the first audio data is encoded in the compressed audio format comprises:
searching a predetermined number of frames of the first audio data to detect a sync word; and
analyzing a data burst of the first audio data subsequent to the sync word to identify an encoding scheme.

5. The playback device of claim 4, wherein the operations further comprise:
after detecting the sync word; and
searching a second predetermined number of frames subsequent to the sync word to identify a second repetition of the sync word.

6. The playback device of claim 4, wherein analyzing the data burst of the first audio data subsequent to the sync word comprises determining that the data burst corresponds to one of a plurality of predetermined valid sequences corresponding to an encoding scheme.

7. The playback device of claim 1, wherein the plurality of decoders comprises at least two or more of: a DOLBY DIGITAL decoder; a DOLBY DIGITAL PLUS decoder, a MAP decoder; a DOLBY ATMOS decoder; a DTS:X decoder; or a MAP decoder.

8. A method of playing back audio content comprising:
receiving, at a playback device, first audio data from a video display device;
receiving an indication from the video display device that the first audio data is encoded in a compressed audio format;
selecting a decoder from among a plurality of decoders;
decoding the first audio data using the selected decoder;
playing back the decoded first audio data via the playback device;
while playing back the first audio data, receiving, at the playback device, second audio data from the video display device, the second audio data encoded via an uncompressed pulse-code modulation (PCM) format;
determining, via the playback device, that the second audio data is encoded in the uncompressed PCM format;
based on the determination that the second audio data is encoded in the uncompressed PCM format, delaying playback of the second audio data for a period of time; and
after delaying playback for the period of time, initiating playback of the second audio data.

9. The method of claim 8, wherein receiving the indication from the video display device that the first audio data is encoded in the compressed audio format comprises detecting a channel status block (CSB) indicating that the first audio data is encoded in a compressed audio format.

10. The method of claim 8, further comprising determining, independently of receiving the indication from the video display device that the first audio data is encoded in the compressed audio format, that the first audio data is encoded in the compressed audio format.

11. The method of claim 10, wherein determining, independently of receiving the indication from the video display device that the first audio data is encoded in the compressed audio format, that the first audio data is encoded in the compressed audio format comprises:
searching a predetermined number of frames of the first audio data to detect a sync word; and
analyzing a data burst of the first audio data subsequent to the sync word to identify an encoding scheme.

12. The method of claim 11, further comprising:
after detecting the sync word; and
searching a second predetermined number of frames subsequent to the sync word to identify a second repetition of the sync word.

13. The method of claim 11, wherein analyzing the data burst of the first audio data subsequent to the sync word comprises determining that the data burst corresponds to one of a plurality of predetermined valid sequences corresponding to an encoding scheme.

14. The method of claim 8, wherein the plurality of decoders comprises at least two or more of: a DOLBY DIGITAL decoder; a DOLBY DIGITAL PLUS decoder, a MAP decoder; a DOLBY ATMOS decoder; a DTS:X decoder; or a MAP decoder.

15. One or more tangible, non-transitory computer-readable media storing instructions that, when executed by one or more processors of a playback device, cause the playback device to perform operations comprising:
　receiving, at the playback device, first audio data from a video display device;
　receiving an indication from the video display device that the first audio data is encoded in a compressed audio format;
　selecting a decoder from among a plurality of decoders;
　decoding the first audio data using the selected decoder;
　playing back the decoded first audio data via the playback device;
　while playing back the first audio data, receiving, at the playback device, second audio data from the video display device, the second audio data encoded via an uncompressed pulse-code modulation (PCM) format;
　determining, via the playback device, that the second audio data is encoded in the uncompressed PCM format;
　based on the determination that the second audio data is encoded in the uncompressed PCM format, delaying playback of the second audio data for a period of time; and
　after delaying playback for the period of time, initiating playback of the second audio data.

16. The one or more computer-readable media of claim 15, wherein receiving the indication from the video display device that the first audio data is encoded in the compressed audio format comprises detecting a channel status block (CSB) indicating that the first audio data is encoded in a compressed audio format.

17. The one or more computer-readable media of claim 15, wherein the operations further comprise determining, independently of receiving the indication from the video display device that the first audio data is encoded in the compressed audio format, that the first audio data is encoded in the compressed audio format.

18. The one or more computer-readable media of claim 17, wherein determining, independently of receiving the indication from the video display device that the first audio data is encoded in the compressed audio format, that the first audio data is encoded in the compressed audio format comprises:
　searching a predetermined number of frames of the first audio data to detect a sync word; and
　analyzing a data burst of the first audio data subsequent to the sync word to identify an encoding scheme.

19. The one or more computer-readable media of claim 18, wherein the operations further comprise:
　after detecting the sync word; and
　searching a second predetermined number of frames subsequent to the sync word to identify a second repetition of the sync word.

20. The one or more computer-readable media of claim 18, wherein analyzing the data burst of the first audio data subsequent to the sync word comprises determining that the data burst corresponds to one of a plurality of predetermined valid sequences corresponding to an encoding scheme.

21. The playback device of claim 1, wherein receiving the second audio data comprises receiving a first plurality of frames of second audio data, and wherein determining, via the playback device, that the second audio data is encoded in the uncompressed PCM format comprises:
　inspecting the first plurality of frames of the second audio data to identify a sync word and/or an encoding tag; and
　after failing to identify a sync word and/or an encoding tag within the first plurality of frames, determining that the second audio data is encoded in the uncompressed PCM format.

22. The playback device of claim 21, wherein the operations further comprise:
　while delaying playback of the second audio data for the period of time:
　　receiving a second plurality of frames of the second audio data;
　　inspecting the second plurality of frames of the second audio data to identify a sync word and/or an encoding tag; and
　　after failing to identify a sync word and/or an encoding tag within the second plurality of frames, confirming that the second audio data is encoded in the uncompressed PCM format; and
　after confirming that the second audio data is encoded in the uncompressed PCM format, initiating playback of the second audio data.

\* \* \* \* \*